(12) United States Patent
Pihl et al.

(10) Patent No.: US 11,855,447 B2
(45) Date of Patent: Dec. 26, 2023

(54) DOWNHOLE ELECTRICAL POWER SUPPLY SYSTEM

(71) Applicant: Halliburton Energy Services, Inc., Houston, TX (US)

(72) Inventors: Joachim Alexander Pihl, Sandefjord (NO); Rodrigo de Carvalho Mendez, Rio de Janeiro (BR); Davi Luciano Figueiredo, Rio de Janeiro (BR)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/303,754

(22) Filed: Jun. 7, 2021

(65) Prior Publication Data

US 2022/0393461 A1 Dec. 8, 2022

(51) Int. Cl.
| | |
|---|---|
| *H02H 7/20* | (2006.01) |
| *H02J 3/00* | (2006.01) |
| *E21B 47/00* | (2012.01) |
| *E21B 17/00* | (2006.01) |
| *E21B 47/12* | (2012.01) |

(52) U.S. Cl.
CPC ............. *H02H 7/20* (2013.01); *E21B 17/003* (2013.01); *E21B 47/00* (2013.01); *H02J 3/0012* (2020.01); *E21B 47/12* (2013.01)

(58) Field of Classification Search
CPC ......... H02H 7/20; E21B 17/003; E21B 47/00; E21B 47/12; H02J 3/0012
USPC ........................................................ 307/112
See application file for complete search history.

(56) References Cited

U.S. PATENT DOCUMENTS

| | | | |
|---|---|---|---|
| 9,970,273 B2 | 5/2018 | Gupta et al. | |
| 10,090,766 B2 | 10/2018 | Da Fonseca | |
| 11,286,772 B2 * | 3/2022 | Hagen | H04L 41/0659 |
| 2008/0047751 A1 * | 2/2008 | Yamate | E21B 47/00 175/50 |
| 2012/0044725 A1 * | 2/2012 | Wrathall | G05F 1/70 363/45 |
| 2013/0026978 A1 | 1/2013 | Cooley et al. | |
| 2017/0331280 A1 * | 11/2017 | Koenecke | E21B 41/00 |
| 2021/0013713 A1 | 1/2021 | Douglas et al. | |

* cited by examiner

*Primary Examiner* — Richard Tan
(74) *Attorney, Agent, or Firm* — DELIZIO, PEACOCK, LEWIN & GUERRA

(57) ABSTRACT

A downhole power supply and method for supplying downhole power are disclosed. In some embodiments a downhole power supply includes a source power supply including a supply cable coupled to an electric energy source. The downhole power supply further includes at least one downhole distribution network to which the supply cable is configured to couple the electric energy source. The at least one downhole distribution network includes, multiple load supplies providing regulated power levels to multiple downhole loads and a network controller configured to individually connect and disconnect each of the load supplies in response to a failure within the downhole distribution network.

20 Claims, 11 Drawing Sheets

DOWNHOLE ELECTRICAL POWER SUPPLY SYSTEM

TECHNICAL FIELD

The disclosure generally relates to the field of electrical power supplies and to downhole electrical distribution networks for configuring supply of electrical power to downhole loads.

BACKGROUND

Downhole well operations generally entail downhole exploration, completion, and production operations. Exploration operations include drilling, logging, measuring, and/or surveying operations for exploring oil and gas formations to optimize well placement based on geophysical, petrophysical, chemical, and/or other properties. Completion operations prepare a well for production after drilling operation and include preparing the borehole and installing a production string and associated downhole production tools. Production operations include oil and gas extraction operations and operations in support thereof. Efficiency of downhole operations increasingly relies on expanding inventory of electrically powered and electronically controlled systems and components. To this end, hydraulic communication and control lines have frequently been replaced by electric power lines, and downhole dynamic systems and components coupled to the power lines are increasingly automated electromechanical systems and components that are controlled and/or operably monitored by remote, surface-based processing systems. Examples of such electromechanical components include flow control devices used in production strings such as fluid pump motors and valves such as interval control valves. Electrical power is also required for downhole measurement activity such as logging during exploration and/or production to determine downhole environmental conditions such as transient operational conditions between wells. Furthermore, remote well monitoring and control of the electronic automated systems have resulted in a substantial increase in the number of permanent downhole gauges (PDGs).

Sourcing and distributing adequate overall power at multiple different power levels to downhole component/system loads presents significant challenges in terms of efficiency and reliability. The reliability issues arise due, in part, to the confined, remote, and otherwise relatively inaccessible disposition of the large numbers of differing downhole loads. The confined wellbore space combined with remote and limited accessibility at distant downhole locations substantially limits flexibility in main powerline configurations. Frequently, downhole systems at any given point in well lifespan from exploration through completion and production are provided electrical power from one or a small number of supply cables that supply electric power from a surface source, such as a set of electrical generators, to each of the downhole loads. Failures in any of the supply cable, the connections and components between the supply cable and loads, and the loads (e.g., load short circuit) may cause broader failure among other power supplies and loads coupled to the supply cable.

BRIEF DESCRIPTION OF THE DRAWINGS

Embodiments of the disclosure may be better understood by referencing the accompanying drawings.

DESCRIPTION OF EMBODIMENTS

Figure 1:
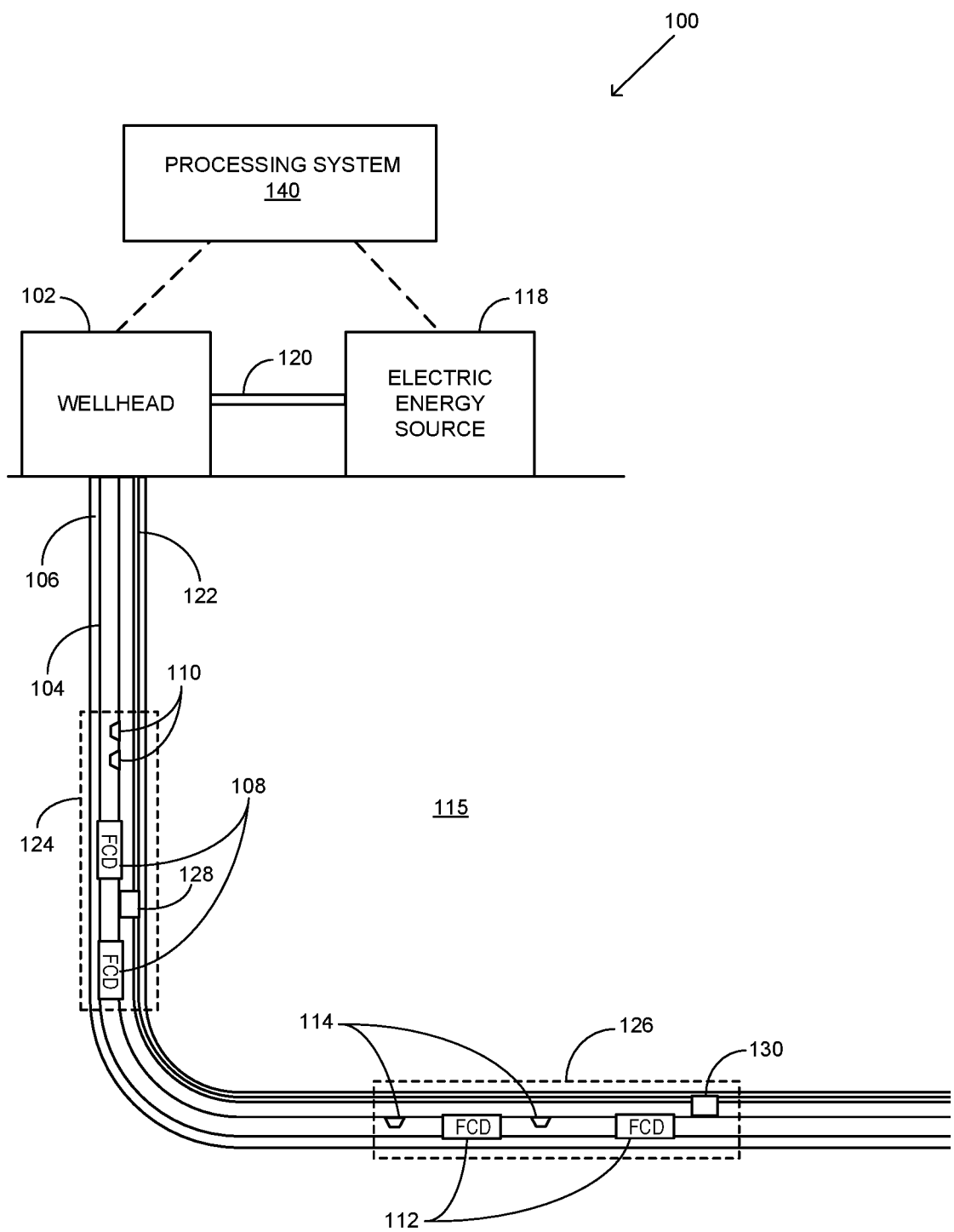
FIG. 1 is a high-level block diagram depicting a well system that implements one or more downhole power distribution networks in accordance with some embodiments.

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Overview

Downhole well operations such as performed during exploration, completion, and production utilize increasingly automated electronic and electrical equipment. Aspects of a downhole power supply system may include a source power supply circuit comprising a surface or downhole electric energy source coupled to a downhole supply cable. Systems and components used to implement downhole operations (referred to herein as loads) receive power via various connections with the supply cable. The limited annular space within a wellbore results in correspondingly limited power cabling and supporting supply protection circuitry. As a result, downhole power supply systems are limited in terms of responding to fluctuations in power supply output that may result from normal operations or failures. For instance, when power is applied to an activated downhole tool, such as a pump motor, the tool draws current, resulting in a voltage drop in the supply cable that reduces the voltage level available to all of potentially many other downhole loads. In some cases, a surface voltage controller may detect the current drawn and determine a corresponding voltage drop across the downhole supply cable. The controller may transmit an instruction to a power source, such as a DC generator, to increase the supply cable voltage to compensate for the operational voltage drop.

While load variations may be compensated via a voltage controller that monitors levels on the supply cable, the systems and components sharing the supply cable may be negatively affected by dramatic fluctuations in supply cable voltage, such as may occur due to a component failure that causes a short circuit in one or more of the downhole loads or the in-situ power supplies that provide requisite voltage levels to the loads from the supply cable power. Supply cable voltage stability may also be compromised, for example, when one or more large loads suddenly cease operational current draw, resulting in potential voltage spikes on the supply cable. In addition to preventing voltage instability in the main supply cable, it is necessary to provide a consistent regulated voltage within the individual well electrical distribution zones. Each distribution zone may include its own local power supply to compensate for power losses including voltage drop along the main power supply line to maintain sufficient supply for the local loads.

Systems, devices, and methods are disclosed herein to address potentially steep fluctuations and/or gradual changes in electrical supply (e.g., voltage and/or current levels) to multiple downhole loads. In some embodiments, a downhole power supply includes a downhole distribution network that receives electric power from a source power supply comprising a supply cable and an electric energy source. The downhole distribution network includes multiple load supplies that provide electric power to multiple loads such as downhole instruments and fluid flow control devices. The downhole distribution network further includes a network controller that receives power from a network control (NC) power supply. In combination, the load supplies and the network controller are configured to enable multiple downhole loads to be powered contemporaneously and semi-independently, such that the effect on the overall power supply of fluctuations induced by failure or non-routine operation of the load supplies and/or loads is minimized. For example, the downhole distribution network is configured to prevent power supply interruption that may otherwise be caused by a short circuit at power supply input capacitors, which may be large ceramic capacitors subject to short circuit failure.

The supply and control components are included in a downhole distribution network that receives source power from the downhole supply cable. The downhole distribution network includes load supplies that provide requisite voltage/current levels to downhole loads and further includes a NC power supply that upon activation, provides one or more relatively low-level DC voltage supply input to activate network controller 220. The NC power supply is the first block to which source supply power is applied in a power-on sequence for the downhole distributed network. The NC power supply is configured to provide power to a network controller and a local communications interface. The network controller includes a programmed processor such as a microcontroller or microprocessor and program logic for maintaining an active/connected or inactive/disconnected state of operation of the system of local power supplies that may be configured as voltage/current regulators. The network controller further includes program logic for implementing a communication protocol to communicate over the local communication interface via the supply cable to implement communications to and from a surface controller.

After the NC power supply within a distribution network is activated, the network controller can send a signal to activate a load power supply (load supply), such as a flyback converter. The load supply provides different regulated output voltages and is configured to activate other load supplies such as switched-mode voltage regulators and/or linear voltage regulators. The voltage regulators are configured to activate and supply downhole loads such as permanent downhole gauges and other instrumentation. Once the NCPS and load supply regulators are stable, the network controller may activate higher power local supplies such as voltage regulators that supply downhole valve control motors and pump motors. In response to a directly or indirectly detected failure in any of the load supplies or the corresponding loads, the corresponding load supply may be deactivated and disconnected from the supply cable to prevent significant supply cable voltage/current fluctuations that may compromise operation of other supplies and loads within the distributed downhole network and possibly other downhole networks.

Example Illustrations

FIG. 1 is a high-level block diagram depicting a well system 100 that implements one or more downhole distribution networks in accordance with some embodiments. Well system 100 generally includes a wellhead 102 that is a surface termination of a wellbore 106 that has been formed such as by drilling within subterranean strata 115. Wellhead 102 includes systems and components configured to implement completion and/or production operations. For embodiments in which well system 100 is configured for completion operations, wellhead 102 may include systems and components configured to install casing during production well construction. Wellhead 102 may also include systems and components configured to install production infrastructure such as production tubing that is intercoupled and installed downhole within wellbore 106 to form a production string 104. During production operations, tubing within production string 104 forms the primary flow conduit through which downhole fluids, such as hydrocarbon fluids, flow from formation(s) within subterranean strata 115 to the surface through wellhead 102. Whether to facilitate production operations and/or completion operations, well system 100 includes electronic and electrical systems and components that are deployed downhole within wellbore 106.

The depicted electronic and electrical systems and components within well system 100 include instruments such as downhole gauges and flow control devices such as pumps, valves, and nozzles that are electrically actuated and operated. For example, FIG. 1 depicts a pair of flow control devices 108 disposed on production string 104 along a vertical section of wellbore 106 and a pair of flow control devices 112 disposed on production string 104 along a horizontal section of wellbore 106. One or more of flow control devices 108 and 112 may comprise pumps for pressurizing fluids and/or valves that directs or otherwise regulates fluid flow within production string 104. For example, one or more of flow control devices 108 and 112 may comprise interval control valves that control flow levels into or out of an isolated portion of a hydrocarbon reservoir.

Each of flow control devices 108 and 112 includes and/or operates using an electric motor or other internal or external electrical actuator device, such as a DC motor that rotates an impeller as a pump motor or a motorized valve actuator. The electrical actuators within flow control devices 108 and 112 may be electronically controlled by a local or remote electronic controller. Wellhead 102 includes electrical connections and interfaces for coupling flow control devices 108 and 112 with power supply sources that provide sufficient power (voltage/current levels). In addition to high power consuming devices such as downhole pumps and valves, well system 100 includes a number of lower power electrical devices such as downhole measurement instruments. For example, well system 100 further includes electrical and electronic devices in the form of permanent downhole gauges (PDGs) including PDGs 110 disposed on production string 104 along a vertical section of wellbore 106 and PDGs 114 disposed on production string 104 along a horizontal section of wellbore 106.

For ease and clarity of illustration and description, only a limited number of electrical and electronic downhole devices are expressly depicted in FIG. 1. Typically, well system 100 includes many downhole electric and electronic components that each become active electrical loads when activated during downhole completion/production operations. To supply the requisite voltage and current levels, well system 100 includes a source power supply that includes an electric energy source 118 and a power supply cable implemented as a tubing encapsulated conductor (TEC) cable 122. In the depicted embodiment, electrical energy source 118 is a surface system such as a generator system comprising a set of generator trucks positioned in proximity to the site of wellhead 102. Electrical energy source 118 may also or alternatively include a powerline electrical source such as a powerline connection or interface. The electrical power sourced and output from electrical energy source 118 may be any combination of DC and/or alternating current (AC) power.

The downhole electrical supply for well system 100 includes a number of downhole power supply units including downhole power supply units 128 and 130. In the depicted embodiment, power is supplied to the downhole loads at the requisite voltage/current levels from TEC cable 122 via the local supply units that may be configured as voltage regulators including voltage converters. The variety of different types of electrically powered downhole loads have different power consumption requirements and are located at widely varying locations along wellbore 106. To efficiently supply power to the different and spatially separated loads, well system 100 is configured to provide semi-independent power supply to designated power supply zones that includes respective sets of loads and local power supplies. To this end, well system 100 includes downhole distribution networks including the pair of depicted downhole distribution networks 124 and 126. As shown, downhole distribution network 124 includes power supply unit 128 that provides power to loads within the network including downhole gauges 110 and flow control devices 108. Downhole distribution network 126 includes load power supply unit 130 that provides power to loads within the network including downhole gauges 114 and flow control devices 112.

In downhole distribution networks 124 and 126, electric power is received by the respective load supplies from TEC cable 122. TEC cable 122 comprises a center conductor such as a solid copper conductor encased within a metallic shield and insulating layer. TEC cable 122 is designed and installed as a permanent or semi-permanent downhole cable to supply power via cable connector heads to downhole systems and components such as distribution networks 124 and 126. TEC cable 122 is also configured as a telemetry link to carry data and instructions via encoded transmissions between the downhole distribution networks 124 and 126 and a surface data processing system 140. As depicted and described in further detail with reference to FIGS. 2-4, a downhole supply cable such as TEC cable 122 is coupled to respective communication interfaces as well as power supply inputs of downhole distribution networks 124 and 126 to enable simultaneous power supply and telemetry functions.

Figure 2A:
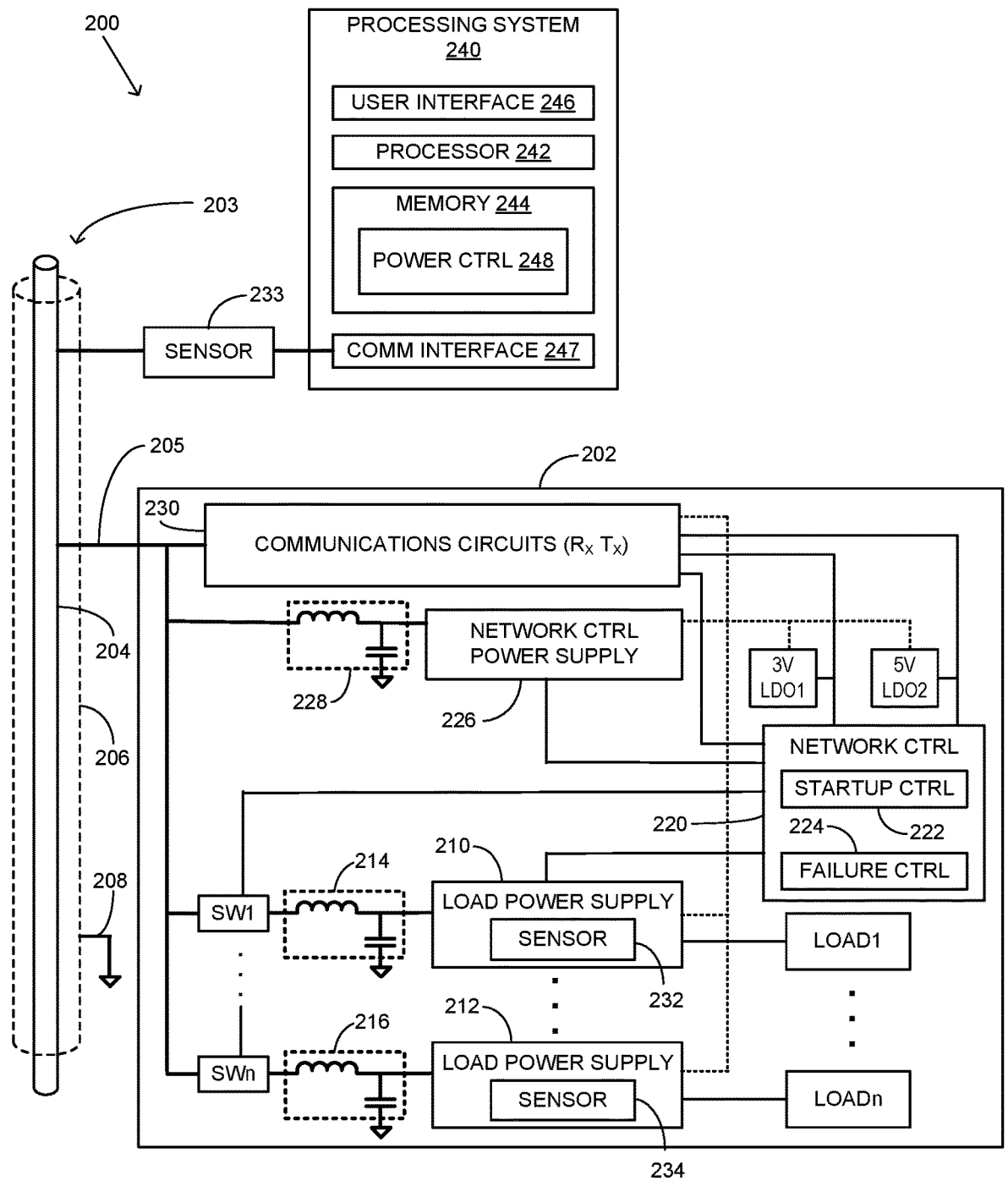
FIG. 2A is a partial component-level and partial block-level diagram illustrating a downhole power supply system in accordance with some embodiments.

FIG. 2A is a partial component-level and partial block-level diagram illustrating a downhole power supply system 200 in accordance with some embodiments. The systems and components depicted and described with reference to FIG. 2A may be implemented in well systems such as the well system 100 shown in FIG. 1. Power supply system 200 includes a downhole distribution network 202 that is configured to locally regulate and supply power to multiple downhole devices and components that consume electricity (loads). For example, distribution network 202 is depicted as including loads LOAD1-LOADn that comprise electrical/electronic loads such as flow control devices including fluid pump motors, valve control motors, and/or other types of actuator motors for controlling downhole completion and/or production operations. Loads LOAD1-LOADn may also or alternatively include a combination of higher power consuming loads such as valve actuator motors and lower power consuming loads such as downhole measurement instrumentation. For instance, a subset of loads LOAD1-LOADn may comprise permanent downhole gauges and another subset may comprise interval control valve actuator motors. Each of loads LOAD1-LOADn may represent a single electric consumer system or device or may represent multiple such systems and devices.

Downhole distribution network 202 further includes a set of in situ load power supplies, each coupled to and supplying electrical power to a respective one or more of loads LOAD1-LOADn. For example, a set of load power supplies including load supplies 210 and 212 are depicted as coupled to respective ones of loads LOAD1-LOADn. A downhole supply cable in the form of a TEC cable 203 provides the source electrical supply to the in-situ supplies within distribution network 202 via a cable interface 205. Cable interface 205 is configured using electrical connector and conductor components to provide an effective electrode to which the supply cable voltage is applied from a center conductor 204 within TEC cable 203. In some embodiments, the voltage levels of the supply power carried by center conductor 204 and cable interface 205 may range between 50-250 VDC. TEC cable 203 further includes a ground contact 208 and tubing 206 that encases center conductor 204. Tubing 206 comprises material layers including conductive and insulating layers configured to protect and electromagnetically shield the center conductor 204. As described with reference to FIG. 1, a TEC cable such as TEC cable 203 is configured to carry encoded data communications as well as DC and/or AC supply power levels. Center conductor 204 within TEC cable 203 may be configured as a mono-conductor or may be configured as a multi-conductor cable with, for example, center conductor 204 comprising a twisted pair of conductors. A twisted-pair configuration may be utilized to reduce noise interference that would otherwise occur during electromagnetically noisy operations or conditions.

The load supplies such as load supplies 210 and 212 are configured using any combination of electrical, electronic, and program systems and components to regulate, convert, or otherwise modify the voltage/current levels input from TEC cable 203. One or more of the load supplies may comprise voltage regulators that generate and output regulated DC voltage levels such as 5, VDC, 12 VDC or 30 VDC to be supplied to the corresponding loads. One or more of the load supplies may comprise linear regulators (sometimes referred to as linear power supplies) that provide requisite output voltage/current levels by dissipating excess input power as resistance losses. In some embodiments, one or more of the load supplies may comprise switched-mode regulators (sometimes referred to as switched-mode power supplies) that utilize a switching element (e.g., MOSFET switch) to efficiently regulate/convert the higher power supply levels within a power distribution system that is otherwise subject to significant DC current losses.

In addition to the voltage/current regulation, the load supplies such as load supplies 210 and 212 include voltage/current spike protection for the supplies themselves and for the corresponding loads. In some embodiments, distribution network 202 includes low-pass filters coupled between the inputs of the load supplies and the source supply power from TEC 203. As shown for example, low-pass filters 214 and 216 are coupled between the inputs of load supplies 210 and 212 and cable interface 205. In the depicted embodiment, low-pass filters 214 and 216 are configured as LC filters including inductive and capacitive elements configured to remove high-frequency voltage/current spikes that may occur on TEC cable 203.

Many varieties of downhole loads and corresponding downhole supplies such as those within distribution network 202 may be connected to TEC cable 203 at numerous locations along a wellbore in which power supply system 200 is installed. Failures within any of the supplies or loads may result in systemic problems due to the interconnections of the many loads to the TEC cable 203. For instance, an electrical short within one of the downhole supplies may result in a downward fluctuation of supply voltage within TEC cable 203 that may adversely affect other downhole supplies and loads. Circuit protection systems and components such as fuses and circuit breakers may be of limited utility due to the relative permanence and lack of ready accessibility to the downhole supplies, loads, and interconnections with TEC cable 203.

Power supply system 200 includes subsystems and components disposed downhole and/or at surface and configured to increase power supply reliability in terms of activation sequencing as well as responding to failures such as short circuits downhole. Distribution network 202 includes a network controller 220 that is configured, using any combination of electronic and programmed processor components, to implement isolative failure control and controlled power supply activation. In some embodiments, network controller 220 implements power supply failure isolation and controlled activation sequencing by generating instructions and transmitting corresponding signals for individually connecting and disconnecting each of the load supplies to and from the source power supply. To implement individually selective connection, distribution network 202 includes controlled switching elements SW1-SWn, each corresponding to a respective load supply and coupled between the input of the load supply and the source supply on cable interface 205. Each of the switching elements SW1-SWn is configured to receive a control input from network controller 220 that either opens or closes the switching element. In some embodiments, the control inputs may comprise enable/disable voltage levels that activate and/or deactivate a regulator control circuit, such as for a load supply configured as a switched-mode voltage converter.

Initial startup of power supply system 200 may entail a sequence in which network controller 220 is activated via a network control power supply (NCPS) 226 prior to sequenced activation of the load power supplies. Startup may begin with application of electric power from an electric energy source (not depicted) to TEC cable 203. The voltage level on TEC cable 203 is applied to automatically activate NCPS 226, which may be configured as a voltage regulator that generates an output voltage that is lower than the output voltages of the load supplies such as load supplies 210 and 212. Similar to the load supplies, NCPS 226 includes an input voltage conditioning element in the form of a low-pass filter 228 configured to remove voltage spikes and suppress current surges from the supply on TEC cable 203. Upon activation, NCPS 226 provides one or more relatively low-level DC voltage supply inputs, such as the depicted 3 VDC and 5 VDC, to at least initially activate network controller 220. To implement startup control such as controlled sequencing of downhole load activation, network controller 220 includes program and/or hardcoded logic (i.e., firmware or microcode) depicted as startup controller 222. Startup controller 222 is configured to implement one or more selectable sequences in which load supplies such as load supplies 210 and 212 are activated in a specified sequence by closing the initially open switching elements SW1-SWn in the selected sequence.

To implement electrical failure isolation, network controller 220 includes program and/or hardcoded logic depicted as failure controller 224. Failure controller 224 is configured to implement selective deactivation and electrical isolation of one or more of the load supplies to electrically isolate a failure (e.g., short circuit) within a load supply or a load from the main supply on TEC cable 203. Failure controller 224 implements isolation, and in some cases detection/identification of the source of a failure, by selectively opening/closing one or more of switching elements SW1-SWn based, at least in part, on failure information that may be received locally downhole or from a surface data processing system 240, that may collect sensor or other data from distribution network or other sources of downhole electrical distribution information.

Data processing system 240 may be disposed and operated at or above surface within or proximate to a wellhead apparatus, for example. Data processing system 240 includes processing and storage components configured to receive and process sensor data detected by a sensor 233 that monitors voltage and/or current levels on center conductor 204. Sensor 233 may be configured as a property sensor and/or may comprise program constructs configured to collect information that directly or indirectly indicated voltage and/or currently levels within downhole systems. Data processing system 240 comprises, in part, a computer processor 242 and a memory device 244 configured to execute program instructions for generating failure response signals such as may be transmitted to network controller 220 via a communication interface 247. Communication interface 247 is configured to transmit and receive signals to and from distribution network 202 as well as other distribution networks within downhole power supply system 200.

Data processing system 240 is configured to control various power supply control components such as startup activation of one or more downhole distribution networks and/or individual loads within the networks to enable coordinated power supply operation. For startup, data processing system 240 may receive and process input from a user interface 246 as well as input information relating to voltage and current levels measured by sensor 233 to determine coordinated startup schedules. For failure response, data processing system 240 may receive, process, and respond to input information from sensor 233 and/or from network controller 220 indicating a failure, such as an electrical short, that may affect voltage/current levels on TEC cable 203. To these ends, data processing system 240 includes a power control program 248 that is configured, using any combination or program logic and data, to generate power control instructions for implementing, adjusting, or otherwise controlling the activation, deactivation, and isolation of downhole electrical devices such as load supplies within distribution network 202. In some aspects, power control program 248 is configured to process electrical power information (e.g., voltage/currently values, changes) measured by downhole and/or surface sensors as well as input from user interface 246 and generate power control instructions in response thereto.

Messages (e.g., instructions) and data may be communicated between surface processing system 240 and network controller 220 via TEC cable 203 as a telemetry link. The communication modes between surface processing system 240 and network controller 220 may comprise different signal modulation types carried using center conductor 204 as the telemetry medium. Distribution network 202 includes a communication interface 230 that is configured to electrically encode messages to and decode messages from TEC cable 203. For example, communication interface 230 may comprise communication circuits for encoding by signal modulation messages generated by network controller 220. Communication interface 230 further includes communication circuits for demodulating messages that contain the information sent by data processing system 240.

Network controller 220 may be configured to determine failures within distribution network 202 based on locally measured electrical information as well as input from data processing system 240. Each of the load power supplies may include a sensor, such as sensors 232 and 234 incorporated within or otherwise coupled to load power supplies 210 and 212, respectively. Sensors 232 and 234 may comprise voltage and/or current sensors that measure voltage/current levels and may be further configured to detect a failure condition such as an over or under voltage condition or an over or under current condition of the corresponding load supply. In some embodiments, sensors 232 and 234 may include sensors that measure conditions or properties that indicate an out-of-threshold electrical condition such as temperature sensors. In response to detecting a failure condition, one of the local sensors sends a corresponding failure signal to network controller 220 to be processed by failure controller 224. In some embodiments, failure controller 224 may be configured to detect a failure condition based on measurement information and without an explicit failure signal from the sensors. In response to a failure signal, network controller 220 transmits one or more control signals to actuate one or more of switches SW1-SWn. As depicted and described in further detail with reference to FIGS. 7 and 8, the switching elements selected for actuation and the sequencing and other manner of actuation may be based on the detected failure condition and the manner in which it is detected (e.g., direct versus indirect detection). The switching actuation ultimately results in electrical isolation of a corresponding one or more of the load supplies from TEC cable 203.

Figure 2B:
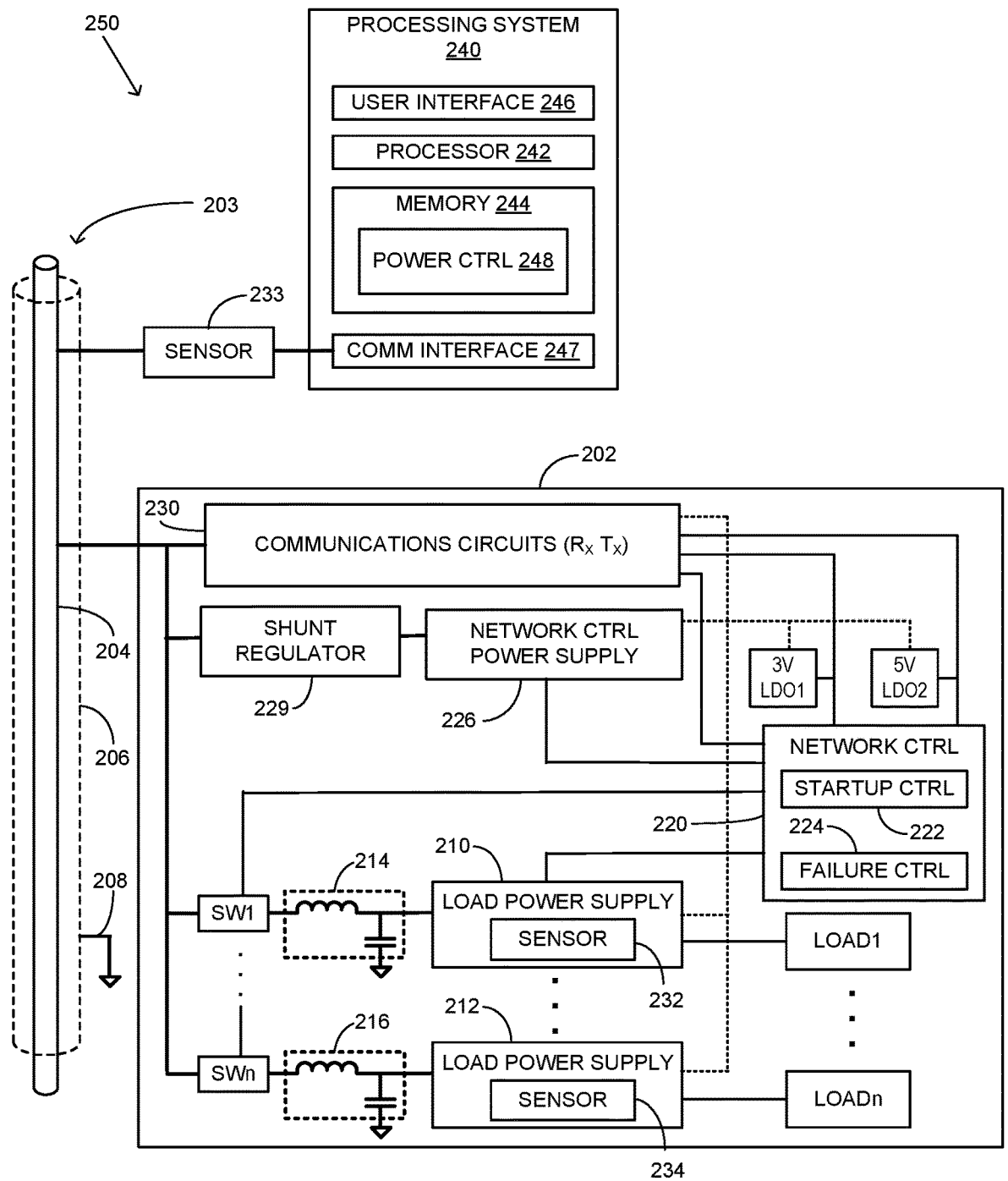
FIG. 2B is a partial component-level and partial block-level diagram illustrating a downhole power supply system in accordance with some embodiments.

As disclosed with reference to FIG. 2A, the power supplies within distribution network 202 include an NCPS 226 configured to provide a reliable, low-voltage supply to network controller 220 to ensure optimal reliability in case of failure. To further increase reliability, distribution network 202 includes low-pass filter 228 configured to remove voltage spikes and suppress current surges from the supply on TEC cable 203. In some embodiments, distribution network may include an active device such as an active voltage or current shunt regulator to further optimize protection of NCPS 226. For example, FIG. 2B is a partial component-level and partial block-level diagram illustrating a downhole power supply system 250 that includes most of the components of power supply system 200 and in which low-pass filter 228 is replaced with a shunt regulator 229. In some embodiments, shunt regulator 229 may be a shunt voltage regulator that includes an active circuit element such as a Zener diode and is electrically connected in parallel with NCPS 226 to provide enhanced surge protection by shunting current surges to ground. In some embodiment, shunt regulator 229 may be a shunt current regulator.

Figure 3A:
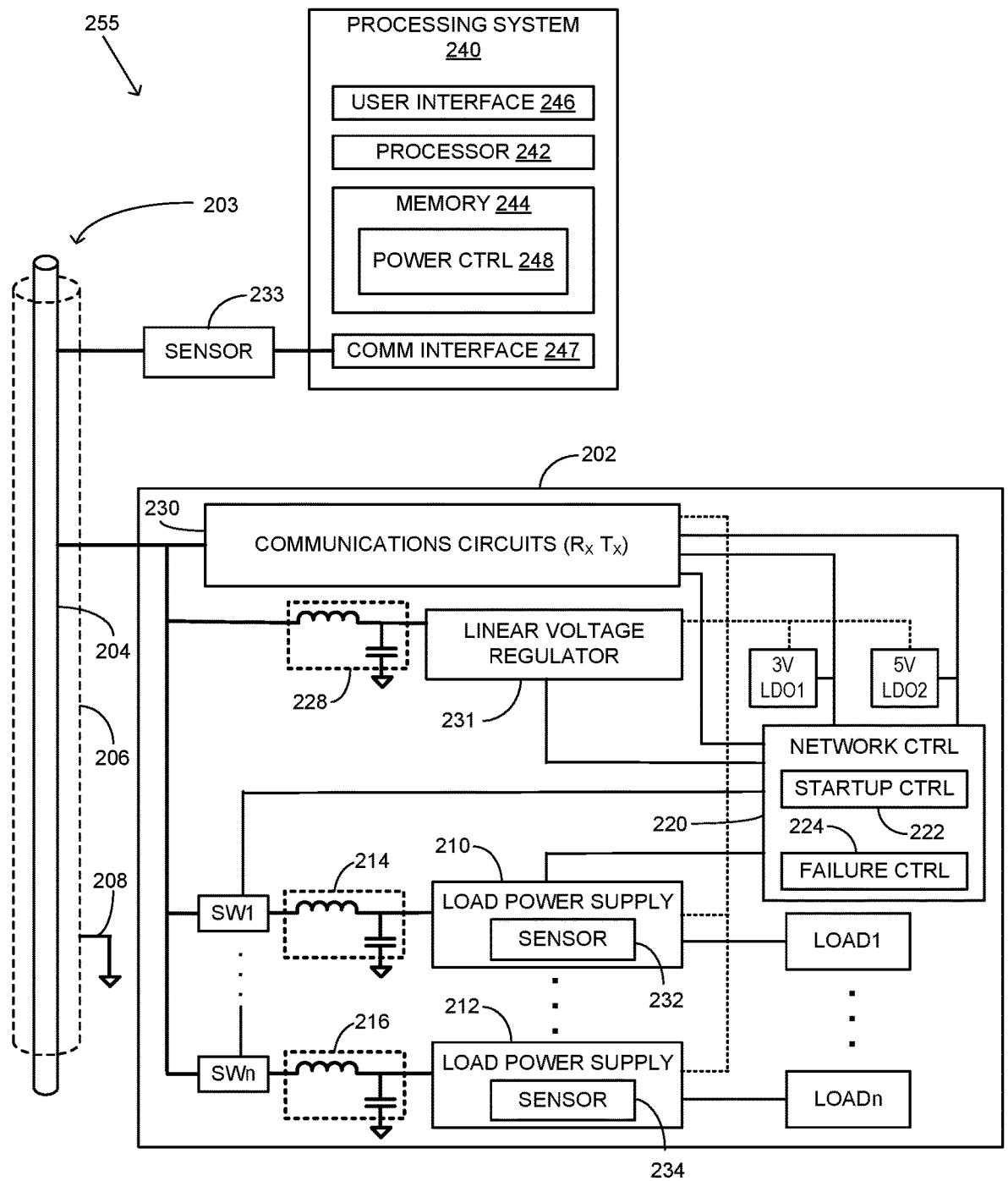
FIG. 3A is a partial component-level and partial block-level diagram illustrating a downhole power supply system in accordance with some embodiments.
Figure 3B:
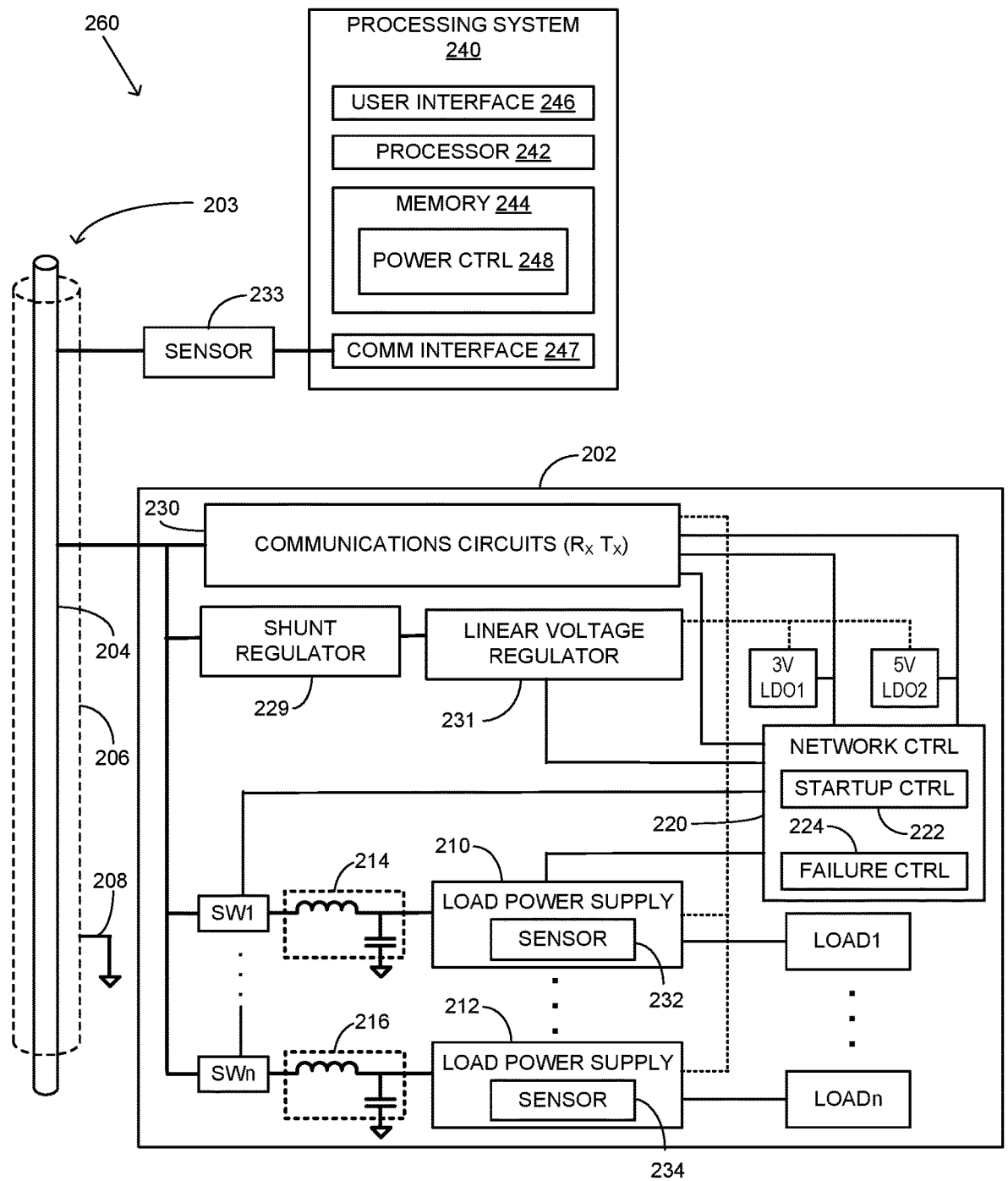
FIG. 3B is a partial component-level and partial block-level diagram illustrating a downhole power supply system in accordance with some embodiments.

The NCPS 226 depicted in FIGS. 2A and 2B may be implemented in a variety of different low-voltage configurations and in combination with different input protection circuits. For example, FIG. 3A is a partial component-level and partial block-level diagram depicting a downhole power supply system 255 that includes most of the components of power supply system 200 and in which NCPS 226 is configured as a linear voltage regulator 231. Linear voltage regulator 231 includes a transistor controlled by a feedback circuit that generates a specified low-voltage output that remains stable regardless of variations in input voltage and load current. In some embodiments, linear voltage regulator 231 includes an output current limiter configured to maintain a stable current output with variations that may occur in load currents. FIG. 3B is a partial component-level and partial block-level diagram illustrating a downhole power supply system 260 that includes most of the components of power supply system 255 and in which low-pass filter 228 is replaced by the shunt regulator 229 depicted and described with reference to FIG. 2B.

Figure 4A:
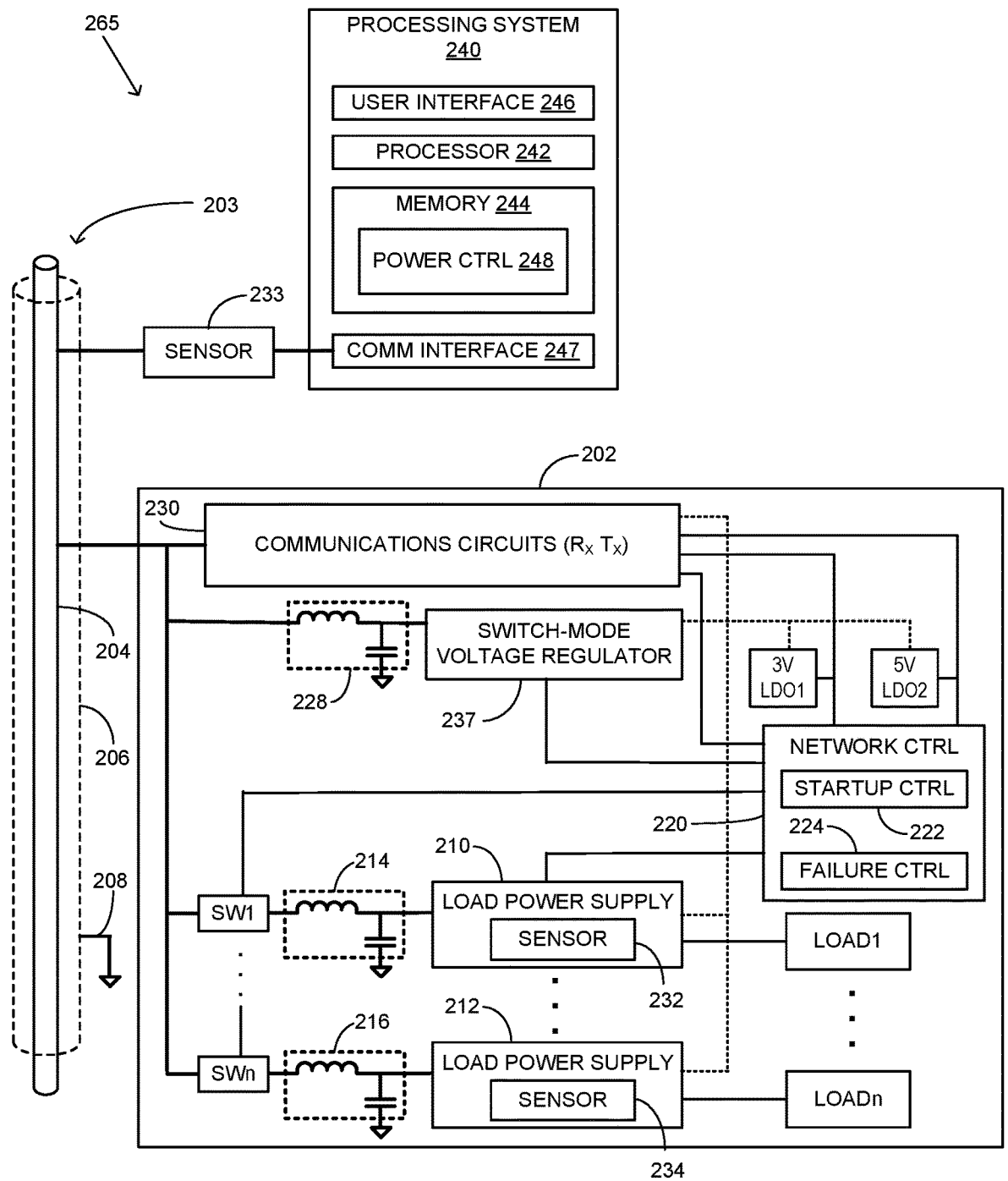
FIG. 4A is a partial component-level and partial block-level diagram illustrating a downhole power supply system in accordance with some embodiments.
Figure 4B:
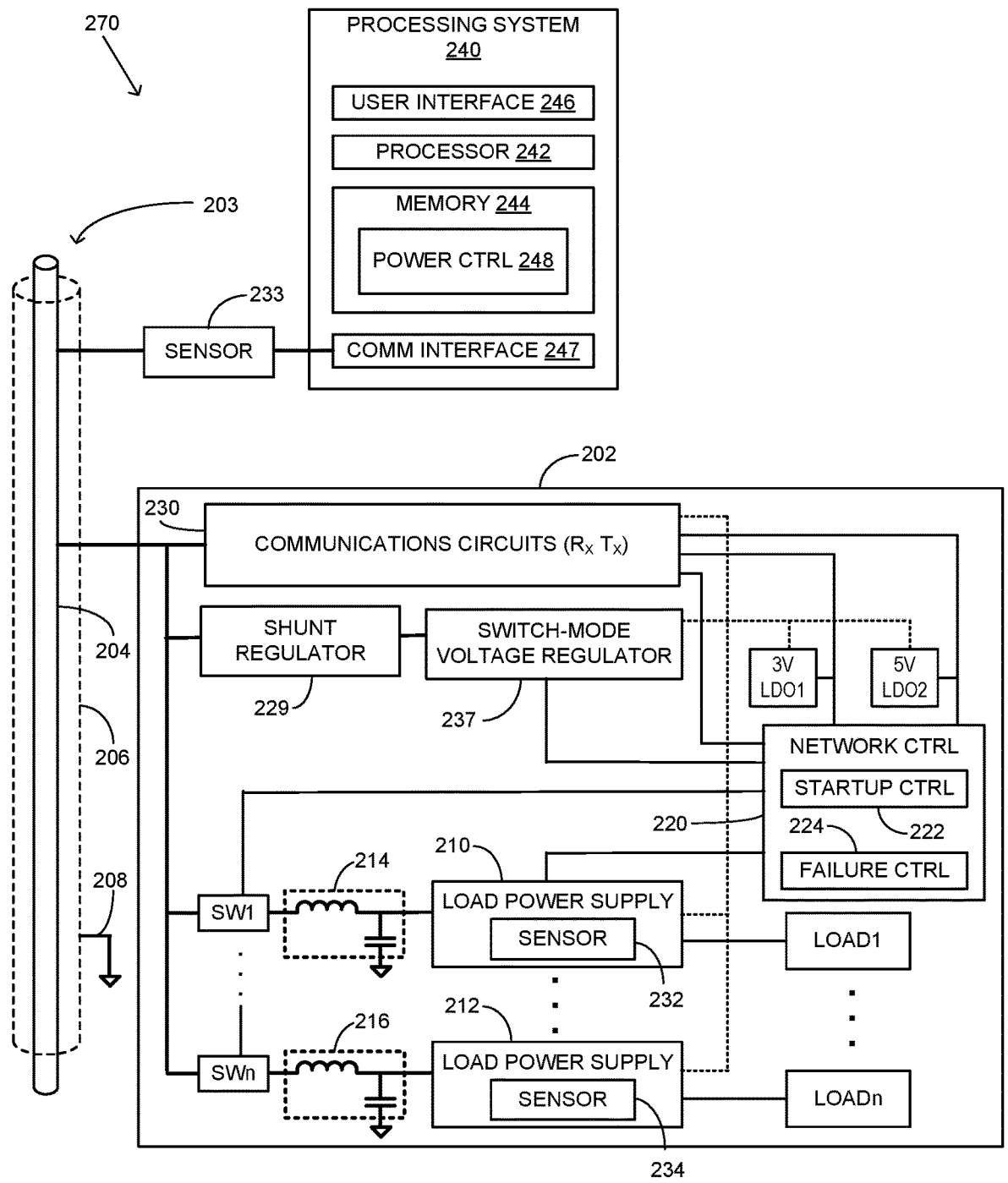
FIG. 4B is a partial component-level and partial block-level diagram illustrating a downhole power supply system in accordance with some embodiments.

The NCPS may be configured as a linear regulator for implementations in which simplicity, regulator noise, and component size may be issues. In some embodiments, the NCPS may be configured as a switch-mode voltage regulator to improve performance and power efficiency. For example, FIG. 4A is a partial component-level and partial block-level diagram depicting a downhole power supply system 265 that includes most of the components of power supply system 200 and in which NCPS 226 is configured as a switch-mode voltage regulator 237. Switch-mode voltage regulator 237 comprises a circuit that includes a power switching element and an output rectifier/filter element to provide a specified output DC voltage level. The power switching in combination with output rectification results in a DC to DC power conversion. FIG. 4B is a partial component-level and partial block-level diagram illustrating a downhole power supply system 270 that includes most of the components of power supply system 265 and in which low-pass filter 228 is replaced by shunt regulator 229.

Figure 5:
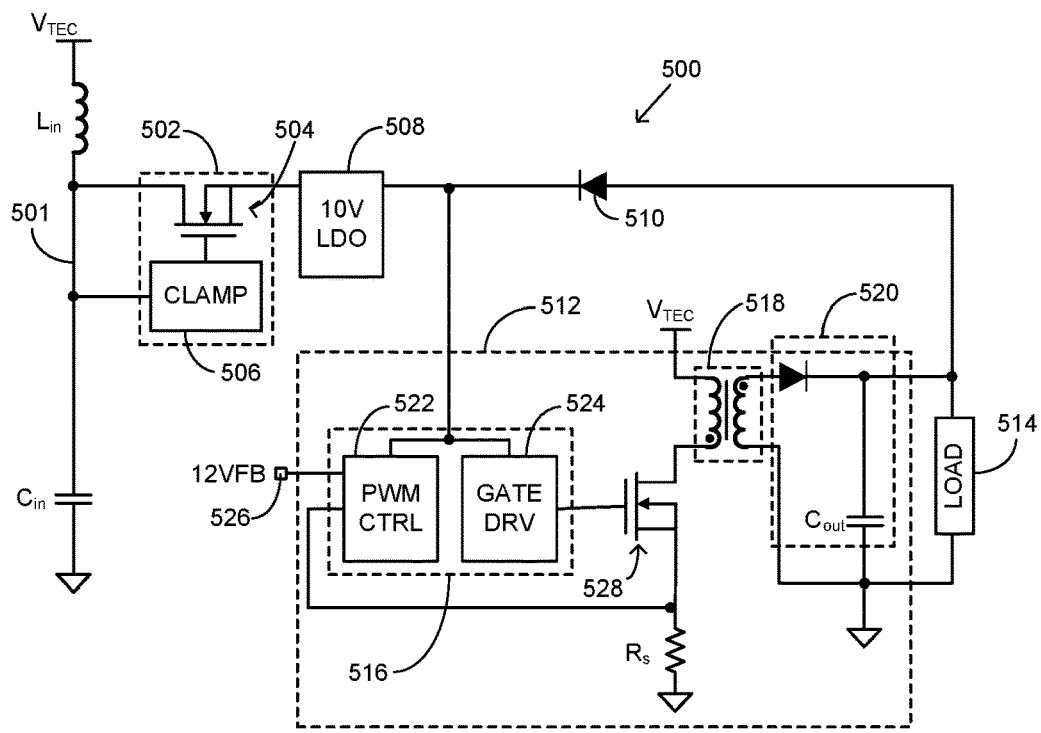
FIG. 5 is a component-level and block-level circuit diagram depicting a low power supply that may be incorporated in a downhole distribution network in accordance with some embodiments.

As disclosed with reference to FIGS. 2-4, the power supplies within distribution network 202 include an NCPS 226 that may be configured as a linear voltage regulator (FIGS. 3A and 3B) or a switch-mode voltage regulator (FIGS. 4A and 4B) to provide a reliable, low-voltage supply to network controller 220. FIG. 5 is a component-level and block-level circuit diagram depicting a switch-mode NCPS 500 configured to include a switched-mode voltage regulator in the form of a flyback converter in accordance with some embodiments. NCPS 500 is coupled to a source supply line 501 that carries the source supply voltage, $V_{TEC}$, supplied from a TEC cable (not depicted). NCPS 500 includes an input low-pas filter comprising inductor Lin and capacitor $C_{in}$ coupled between the supply voltage and ground to shunt voltage spikes at the input of the power supply.

Additional components at the input of NCPS 500 include a voltage regulator comprising a low drop-out (LDO) linear regulator 508 and a pre-regulator 502 coupled between the source supply voltage and LDO regulator 508. Pre-regulator 502 includes a power metal oxide silicon field effect transistor (MOSFET) 504 and a clamp circuit 506. Power MOSFET 504 is configured as a switching pass element having a pass voltage level controlled by the gate voltage set by clamp circuit 506. LDO regulator 508 is coupled between the supply source 501 and a flyback converter 512. LDO regulator 508 is configured to maintain a 10 VDC output at the control input node of a flyback converter 512 and to limit startup current of flyback converter 512. The control input to flyback converter 512 is further maintained by an isolation diode 510 coupled between the control input node of flyback converter 512 and a load 514. During startup of a distributed network that includes NCPS 500, the relatively high-level voltage initially supplied from supply line 501 is regulated down to the 10 VDC and applied to control inputs of a flyback control circuit 516 within flyback converter 512. More specifically, the activation voltage input is applied to the activation inputs of a pulse-width modulation (PWM) controller 522 and a gate driver 524 within flyback control circuit 516.

Once activated, PWM controller 522 and gate driver 524 are configured to apply a gate signal (switching control signal) to a switching device configured as a power MOSFET 528. Gate driver 524 switches (pumps) power MOSFET 528 on and off via the signal applied to the gate of MOSFET 528 based on a duty cycle determined by PWM controller 522. The source to drain path of MOSFET 528 draws current through the primary coil of a flyback transformer 518 that may be configured as a coupled inductor. As shown, the primary coil is coupled to the supply voltage, $V_{TEC}$, and the current through the source side flows through a sense resistor, $R_s$. Flyback transformer 518 converts the voltage signals across the primary coil into corresponding pulse signals across the secondary coil of flyback transformer 518. The pulses are rectified and filtered by an output rectifier 520 comprising a series diode and output capacitor, Cout, to generate a stable output DC voltage level such as 12 VDC that is applied as input power to load 514. PWM controller 522 adjusts duty cycle to maintain a constant output DC voltage level using references voltages from load 514 and from the top of $R_s$.

Figure 6:
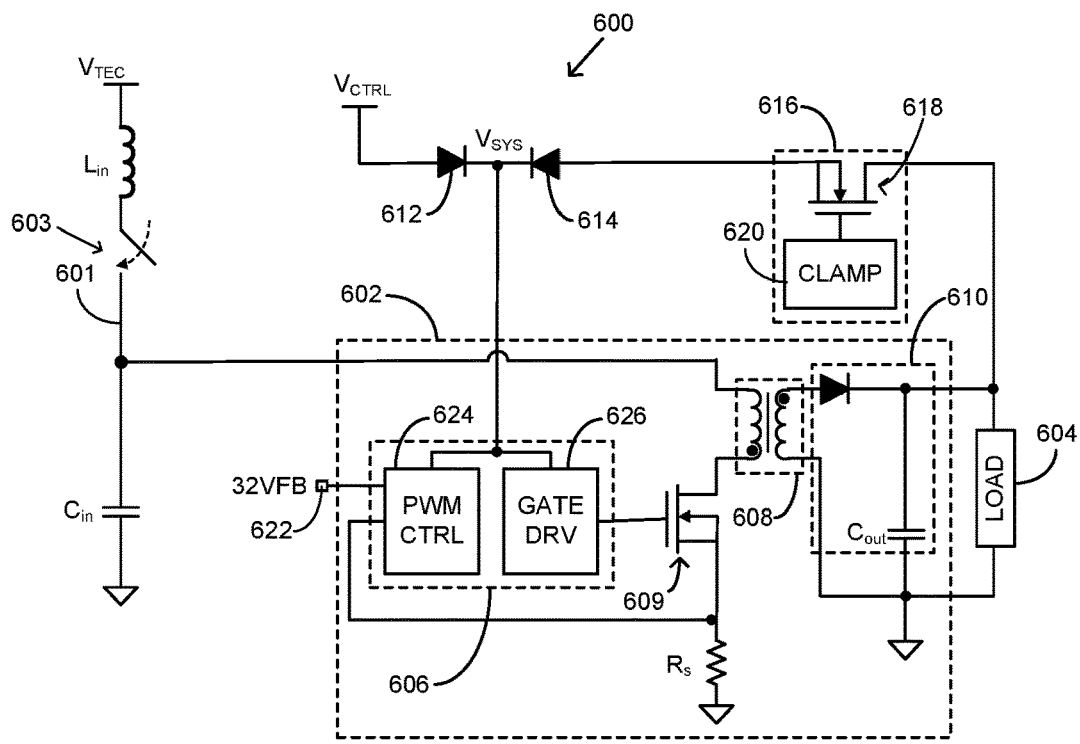
FIG. 6 is a component-level and block-level circuit diagram illustrating a load supply that may be incorporated in a downhole distribution network in accordance with some embodiments.

As disclosed with reference to FIGS. 2-4, the load power supplies within distribution network 202 may be configured as switch-mode voltage regulators. FIG. 6 is a component-level and block-level circuit diagram depicting a switch-mode load supply 600 configured to include a flyback converter in accordance with some embodiments. Load supply 600 is coupled to a source supply line 601 that carries the source supply voltage, $V_{TEC}$, supplied from a TEC cable (not depicted). As depicted and described with reference to FIGS. 2-4, connectivity of load supply 600 to source supply line 601 is determined based on the controlled position of a control switch 603. Load supply 600 includes an input low-pass filter comprising inductor Lin and capacitor Cm coupled between the source voltage input and ground to shunt voltage spikes at the input of the load supply.

Load supply 600 further includes a control input path comprising a pair of diodes 612 and 614 coupled to a control input signal, VCTRL, that is received from a NCPS within the same downhole distribution network as load supply 600. The control signal is generated as a switch actuation signal by the network controller to actuate the switching element within load supply 600, which in the depicted embodiment, comprises the activation inputs to a flyback control circuit 606 within a flyback converter 602. The control input of load supply 600 further includes a pre-regulator 616 comprising a power MOSFET 618 and a clamp circuit 620 and coupled between the diode 614 and a load 604. The control input level is further maintained by diodes 612 and 614. For activation or deactivation and isolation of load supply 600, the network controller sends a signal (e.g., voltage level) to the control inputs of flyback control circuit 606. More specifically, the activation control signal is applied to the activation inputs of a PWM controller 624 and a gate driver 626 within flyback control circuit 606.

Once activated, PWM controller 624 and gate driver 626 are configured to apply a gate signal (switching control signal) to a switching device configured as a power MOSFET 609. Gate driver 626 switches (pumps) power MOSFET 609 on and off via the signal applied to the gate of MOSFET 609 based on a duty cycle determined by PWM controller 624. The source to drain path of MOSFET 609 draws current through the primary coil of a flyback transformer 608 that may be configured as a coupled inductor. As shown, the primary coil is coupled to the supply voltage, $V_{TEC}$, and the current through the source side flows through a sense resistor, $R_s$. Flyback transformer 608 converts the voltage signals across the primary coil into corresponding pulse signals across the secondary coil of flyback transformer 608. The pulses are rectified and filtered by an output rectifier 610 comprising a series diode and output capacitor, Cout, to generate a stable output DC voltage level such as 30 VDC that is applied as input power to load 604. PWM controller 624 adjusts duty cycle to maintain a constant output DC voltage level using references voltages from load 604 and from the top of $R_s$.

Figure 7:
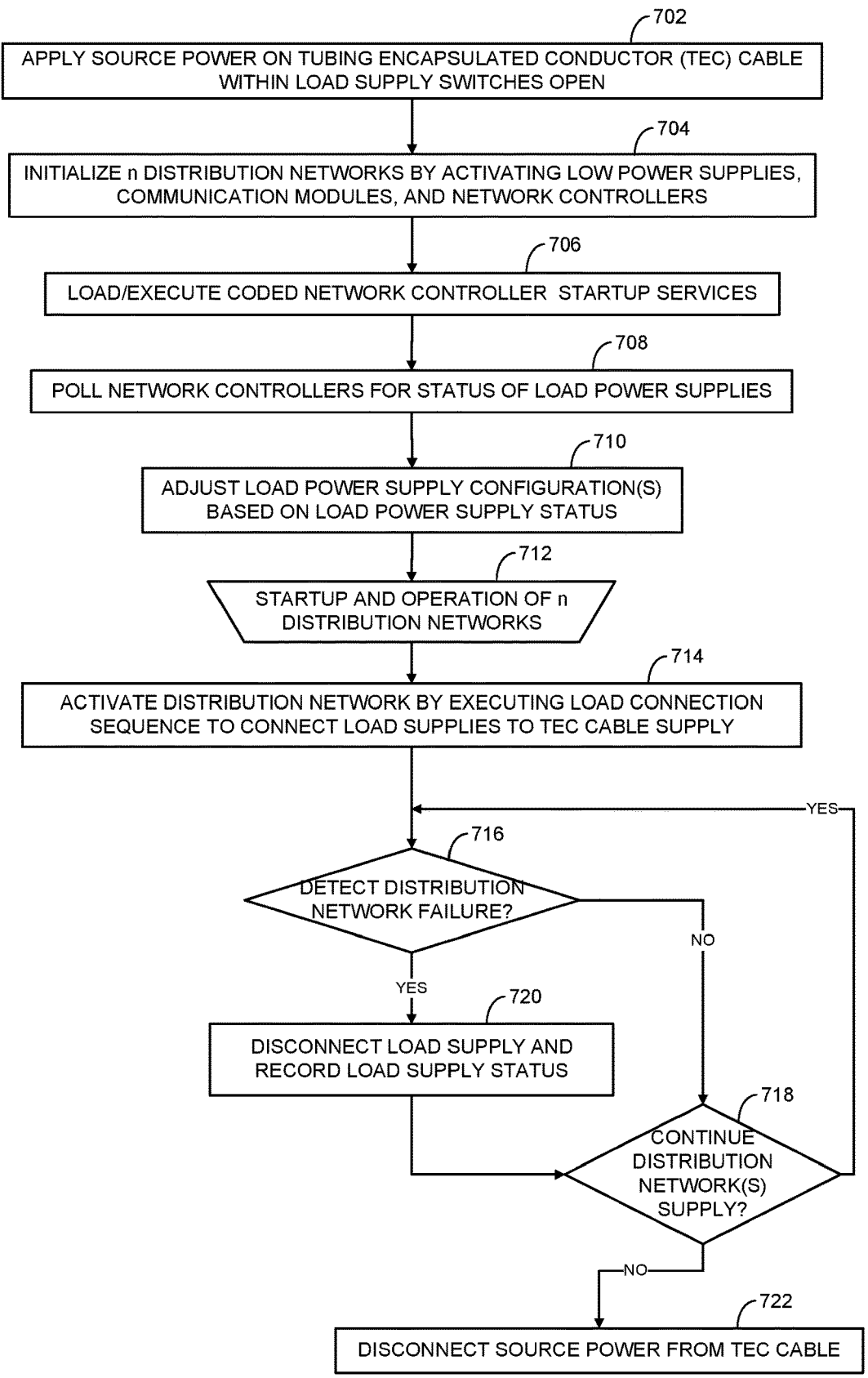
FIG. 7 is a flow diagram depicting operations and functions for implementing downhole power supply operation in accordance with some embodiments.

The systems and components depicted and described with reference to FIGS. 1-6 may be utilized to supply power to potentially large numbers of downhole electrical loads in a manner enabling individualized activation/deactivation control such as during startup and for failure isolation. FIG. 7 is a flow diagram depicting operations and functions for implementing downhole power supply operation in accordance with some embodiments. The operations and functions depicted and described with reference to FIG. 7 may be performed by one or more of the systems and components depicted and described with reference to FIGS. 1-6. The process begins as shown at block 702 with a source power supply system applying source power to a downhole power supply cable such as a TEC cable. The application of source power may comprise selectively connecting an electric energy source such as a battery bank and/or a set of one or more DC generators to the downhole cable such as via a surface power controller. Together the electric energy source and downhole supply cable form a source power supply that is incorporated in an overall power supply that includes downhole distribution networks to which the power is supplied. As further depicted at block 702, an initial startup for one or more of the downhole distribution networks may entail application of power to the distribution networks with the corresponding load supplies not connected (i.e., the input switches are open).

In some embodiments, the NCPS for each of the distribution networks is automatically activated in response to application of power to the supply cable. At block 704 the NCPS supplies of the distribution networks are activated such as via the configuration depicted in FIG. 5 in which the source supply power is regulated to a suitable activation voltage that is applied to the NCPS. Once activated, the NCPS provides the requisite power levels (voltage/current levels) to activate other distribution network components such as the network controller and communication circuits. Initially activated, a network controller in each of the distribution networks loads and executes a coded startup services that may include a standby mode during which instructions may be received from a surface processing system for activating downhole load supplies and loads (block 706).

With the distribution networks initialized, a supply controller such as incorporated within one of the distribution networks on within a surface processing system may determine a load supply configuration to activate downhole loads within the distribution networks. At block 708, the supply controller polls each of the distribution networks to determine the operational status of the load power supplies within each distribution network. For instance, each of the network controllers may record operational status in terms of whether a local load supply has failed. At block 710, the supply controller may modify a load supply configuration based in part on the operational status of the load supplies and/or on input from a user interface to the supply controller.

The supply controller determines an initial load supply configuration for each of the distribution networks and transmits instructions to the network controllers in each of the networks to activate the distribution network loads (block 712). At block 714, each of the network controllers determines and executes a load supply startup sequence based on the initial load supply configuration and the power outputs of the supply loads. For example, a network controller may generate and transmit control signals to the switching elements of each of the load supplies in a sequence based on output voltage with higher voltage supplies activated prior to lower voltage supplies. In some embodiments, the startup sequence executed at block 714 may be determined in whole or in part by processing elements such as a supply controller external to the distribution networks.

Following load supply startup, and as shown at inquiry block 716, the network controller and other controller monitors electrical conditions such as voltage and/or current levels within one or more of the distribution networks or on the supply cable to detect occurrences of failure conditions such as short circuits. In the absence of a failure indication, the network controllers continue operation with each of the loads remaining connected via the switching elements to the downhole supply cable. In response to detecting a failure condition at block 716, a corresponding network controller disconnects a load supply associated with the failure by actuating a switching element coupled between the input of the load supply and the source power supply (block 720). The network controller may also be configured to record the operational status (e.g., fail) in association with an identifier code for the load supply to be utilized in determining future load supply configurations. Operation of the distribution network(s) continues with failure monitoring and failure response sequencing until a supply controller discontinues operation at block 718 that may include disconnecting one or more distribution networks from the source power supply (block 722).

Figure 8:
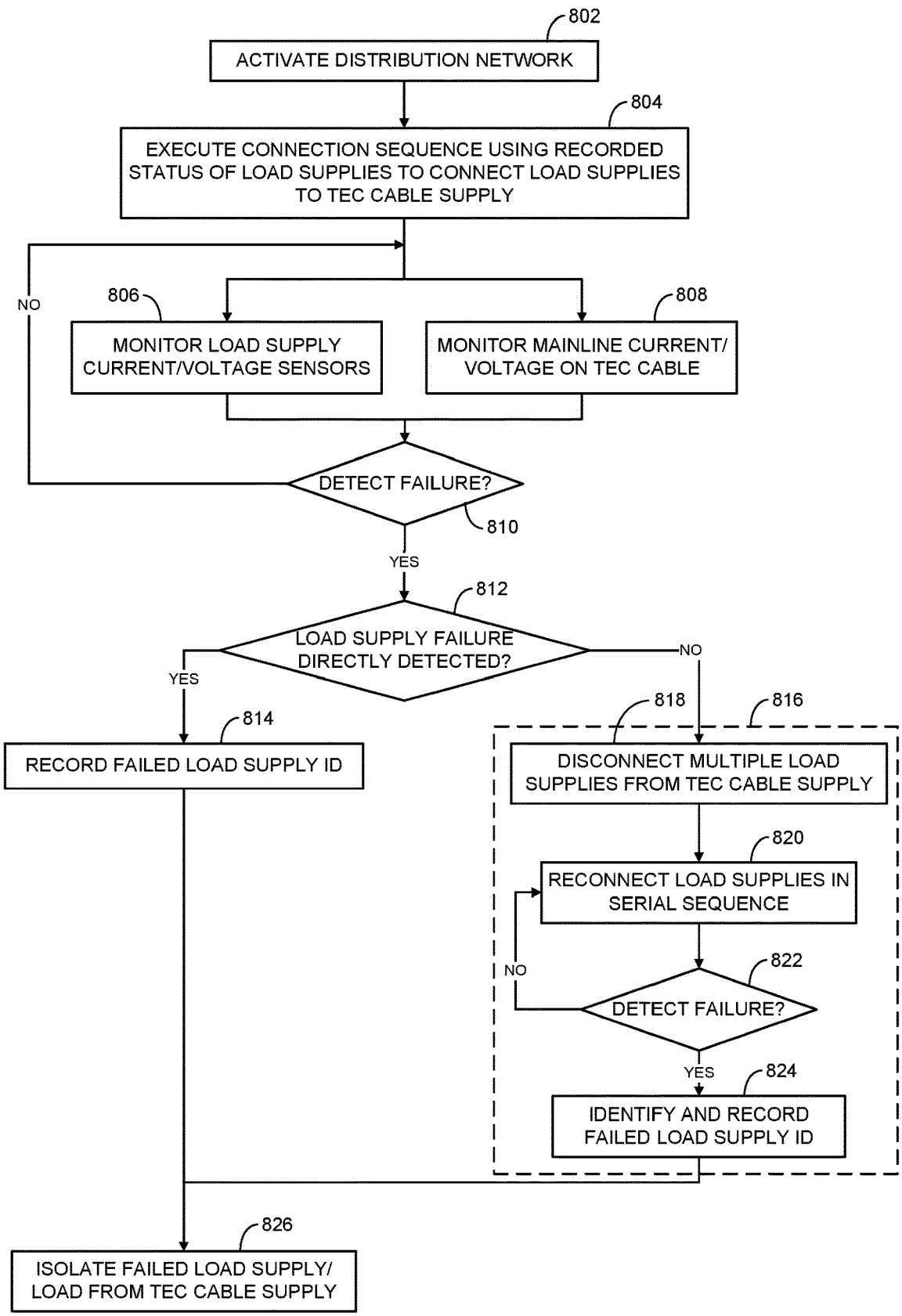
FIG. 8 is a flow diagram illustrating operations and functions for implementing connection sequences for load supply startup and failure isolation in accordance with some embodiments.

FIG. 8 is a flow diagram illustrating more detailed operations and functions for implementing connection sequences for load supply startup and failure isolation in accordance with some embodiments. The operations and functions depicted and described with reference to FIG. 8 may be performed by one or more of the systems and components depicted and described with reference to FIGS. 1-7. The process begins as shown at block 802 with a supply controller initially activating a distribution controller by applying source power to a NCPS that in response activates a network controller and communication circuits within the distribution network. At block 804, the network controller executes a connection sequence to connect the load supplies within the distribution network to the source power supply by actuating corresponding switching elements. In some embodiments, the connection sequence is determined based on operational status of the load supplies such as may be recorded by the network controller. The connection sequence may be further determined based on the power output of the load supplies such as the voltage output and/or the current load on the load supplies. For instance, the network controller may activate load supplies having a higher voltage output and/or current load prior to activating lower voltage/current output load supplies.

During operation of the activated load supplies and corresponding loads, the power supply system may directly, locally measure the voltage/current levels within the load supplies using sensors incorporated within or otherwise coupled to the load supplies such as depicted in FIGS. 2-4 (block 806). Additionally, or alternatively, the power supply system may include one or more sensors for measuring main supply voltage/current such as depicted in FIGS. 2-4 (block 808). The network controller and/or an external supply controller monitors the measured voltage/current levels and may detect or otherwise determine a failure condition based, for example, on a voltage/current level exceeding (i.e., meeting or falling above or below) a specified threshold value (block 810). As shown at inquiry block 812, in response to a failure condition having been directly detected by a sensor measuring voltage/current levels of a particular one or more load supplies, control passes to block 814. At block 814, the network controller records the failure condition (e.g., fail) in association with an identifier code corresponding to the load supply that the failure was detected in association with and at block 826 the network controller isolates the failed load supply and corresponding load from the source supply cable by actuating a corresponding switching element.

If the failure condition detected at block 810 is detected indirectly, by for example, a voltage current level on the source supply cable, control passes to superblock 816 within which a load supply failure identification sequence is executed. At block 818, the network controller actuates switching elements within the distribution network to disconnect multiple and in some cases all of the load supplies from the source cable supply. Following disconnection of the load supplies, the network controller may determine whether the status of the failure condition (i.e., the over or under voltage or current condition detected at block 810) to determine whether the condition has resolved and therefore that the failure occurred within or in association with one of the disconnected load supplies. At block 820, the network controller begins a sequence of individually and sequentially reconnecting the load supplies while continuing to monitor the failure detection sources (e.g., monitoring the source supply line) such as via communications with a surface processing system. The network continues to sequentially reconnect the load supplies until the failure condition is detected (block 822) and in response control passes to block 824 with the network controller identifying the failed load supply as the supply to be reconnected when the failure is detected. The network controller records the identity of the failed load supply and isolates the load supply at block 826.

Example Computer

Figure 9:
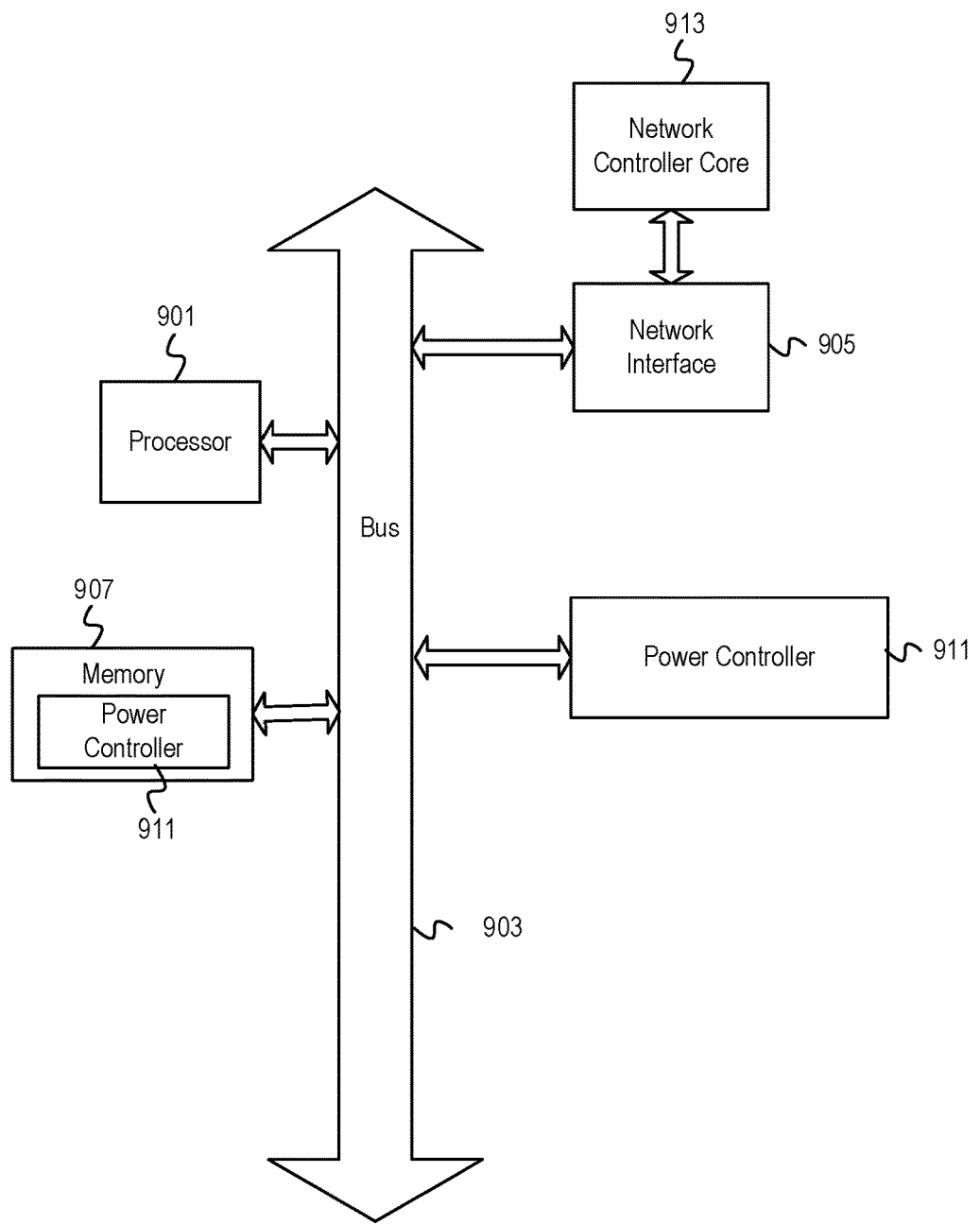
FIG. 9 is a block diagram depicting an example computer system that may be utilized to implement operations and function performed by a main power supply controller and a distribution network controller in accordance with some embodiments.

FIG. 9 is a block diagram depicting an example computer system that may be utilized to implement operations and function performed by a main power supply controller and a network interface unit controller in accordance with some embodiments. The computer system includes a processor 901 possibly including multiple processors, multiple cores, multiple nodes, and/or implementing multi-threading, etc. The computer system includes a memory 907. The memory 907 may be system memory (e.g., one or more of cache, SRAM, DRAM, etc.) or any one or more of the above already described possible realizations of machine-readable media. The computer system also includes a bus 903 (e.g., PCI, ISA, PCI-Express, InfiniBand® bus, NuBus, etc.) and a network interface 905 which may comprise a Fiber Channel, Ethernet interface, SONET, or other interface.

The system includes a power supply controller 911, which may comprise software program instructions stored within and executed from memory 907. Additionally, or alternately, power supply controller 911 may comprise a distinct module including hardware, software, firmware, or a combination thereof. Power supply controller 911 may be configured to operate similarly to surface power supply controller 248 in FIG. 2. The system also includes a network controller core 913 that is configured to operate within the network controllers depicted and described with reference to FIGS. 1-8. Any one of the previously described functionalities may be partially (or entirely) implemented in hardware and/or on the processor 901 and/or network controller core 913. For example, the functionality may be implemented with an application specific integrated circuit, in logic implemented in the processor 901 and/or network controller core 913 in a co-processor on a peripheral device or card, etc.

Variations

While the aspects of the disclosure are described with reference to various implementations and exploitations, it will be understood that these aspects are illustrative and that the scope of the claims is not limited to them. In general, techniques for implementing power supply operations including startup and failure isolation sequencing as described herein may be performed with facilities consistent with any hardware system or systems. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. Use of the phrase "at least one of" preceding a list with the conjunction "and" should not be treated as an exclusive list and should not be construed as a list of categories with one item from each category, unless specifically stated otherwise.

Example Embodiments

First Embodiment: A downhole power supply comprising: a source power supply including a supply cable coupled to an electric energy source; and at least one downhole distribution network to which the supply cable is configured to couple the electric energy source, wherein the at least one downhole distribution network includes, a plurality of load supplies providing regulated power levels to a plurality of loads; and a network controller configured to individually connect and disconnect each of load supplies in response to a failure within the downhole distribution network. The downhole distribution network may further include a plurality of supply connect switches each corresponding to a respective one of the load supplies and disposed between a respective load supply and the source power supply, and wherein said network controller is configured to connect and disconnect each of the load supplies by actuating the supply connect switches. The downhole distribution network may further include one or more sensors configured to detect electric signal levels for one or more of the load supplies. The network controller may be configured to determine a failure within the downhole distribution network based, at least in part, on input from the sensors, wherein determining the failure includes identifying a load supply or a load associated with the failure. The network controller may be configured to actuate a supply connect switch corresponding to the identified load supply or load in response to the failure. The network controller may be configured to communicate with a power supply controller that is communicatively coupled with the downhole distribution network via the supply cable. The network controller may be configured to execute a failure isolation sequence in response to a failure indicator signal from the power supply controller, wherein the failure isolation sequence includes: disconnecting a plurality of the load supplies by contemporaneously opening supply connect switches of the plurality corresponding to the load supplies; and sequentially reconnecting the plurality of load supplies by sequentially closing the supply connect switches of the plurality of load supplies while monitoring a current and voltage level on the supply cable. The downhole power supply may further comprise a network control power supply that receives power from the source power supply and is configured to generate an output voltage to startup the network controller and the load supplies. The downhole power supply may further comprise a voltage conditioning element coupled between the network control power supply and the source power supply, the voltage conditioning element comprising a low-pass filter or a shunt regulator. The network control power supply may comprise a switched-mode voltage regulator. The switched-mode voltage regulator may comprise a flyback converter. The network control power supply may further comprise: a pre-regulator coupled between the supply cable and a low-dropout regulator and configured to step down voltage on the supply cable, wherein the low-dropout regulator is coupled between the pre-regulator and the switched-mode voltage regulator, and said low-dropout regulator may be configured to: limit startup current of the switched mode voltage regulator; and convert voltage from the pre-regulator to a regulated output voltage received at an input of the switched mode voltage regulator.

Embodiment 2: A method for managing downhole distribution of electric power, said method comprising: connecting a downhole distribution network to a source power supply, wherein the downhole distribution network comprises a network controller and a plurality of load supplies coupled to the network controller, each of the load supplies having a supply connect switch between the load supply and the source power supply; and in response to determining a failure within the downhole distribution network, the network controller disconnecting at least one of the load supplies from the source power supply by opening a supply connect switch of the at least one of the load supplies. The source power supply may comprise a supply cable coupled to an electric energy source, and wherein determining a failure within the downhole distribution network may comprise identifying a device in which the failure occurred, including, in response to detecting a current or voltage level on the supply cable: disconnecting a plurality of the load supplies by contemporaneously opening supply connect switches of the plurality of the load supplies; and sequentially reconnecting the plurality of load supplies by sequentially closing the connect switches of the plurality of load supplies while monitoring a current and voltage level on the supply cable. The source power supply may include a supply cable coupled to an electric energy source, and wherein the downhole distribution network includes a network control power supply, and said method may further comprise: applying power from the electric energy source to the supply cable; and wherein said connecting the downhole distribution network to the source power supply includes initializing the downhole distribution network by applying power from the supply cable to activate the network control power supply while the supply connect switches of the load supplies are open. Said connecting the downhole distribution network to the source power supply may further include: applying power from the network control power supply to activate the network controller; and in response to application of power from the network control power supply, the network controller, determining an operational status of one or more of the load supplies; and activating one or more of the load supplies based, at least in part, on the determined operational status. Said activating one or more of the load supplies may include the network controller executing a load supply activation sequence in which two or more of the load supplies are activated in a sequence that is based, at least in part, on power outputs of the two or more load supplies. Detecting a failure within the downhole distribution network may comprise detecting a failure in a load supply or a load. The one or more of the load supplies may comprise switched-mode voltage regulators. At least one of the switched-mode voltage regulators may comprise a flyback converter.

Embodiment 3: An apparatus comprising: a processor; and a machine-readable medium having program code executable by the processor to cause the apparatus to, connect a downhole distribution network to a source power supply, wherein the downhole distribution network comprises a network controller and a plurality of load supplies coupled to the network controller, each of the load supplies having a supply connect switch between the load supply and the source power supply; and in response to determining a failure within the downhole distribution network, the network controller disconnecting at least one of the load supplies from the source power supply by opening a supply connect switch of the at least one of the load supplies.

What is claimed is:

1. A downhole power supply comprising:
    a source power supply including a supply cable coupled to an electric energy source; and
    at least one downhole distribution network to which the supply cable is configured to couple the electric energy source, wherein the at least one downhole distribution network includes,
        a plurality of load supplies providing regulated power levels to a plurality of loads; and
        a network controller configured to, control an activation sequence of the plurality of load supplies; and individually connect and disconnect each of the load supplies from the source power supply in response to a failure within the downhole distribution network.

2. The downhole power supply of claim 1, wherein the downhole distribution network further includes a plurality of supply connect switches each corresponding to a respective one of the load supplies and disposed between a respective load supply and the source power supply, and wherein said network controller is configured to connect and disconnect each of the load supplies by actuating the supply connect switches.

3. The downhole power supply of claim 1, wherein the downhole distribution network further includes one or more sensors configured to detect electric signal levels for one or more of the load supplies.

4. The downhole power supply of claim 3, wherein the network controller is configured to determine the failure within the downhole distribution network based, at least in part, on input from the one or more sensors, wherein determining the failure includes identifying a load supply or a load associated with the failure.

5. The downhole power supply of claim 4, wherein the network controller is configured to actuate a supply connect switch corresponding to the identified load supply or load in response to the failure.

6. The downhole power supply of claim 1, wherein the network controller is configured to communicate with a power supply controller that is communicatively coupled with the downhole distribution network via the supply cable.

7. The downhole power supply of claim 6, wherein the network controller is configured to execute a failure isolation sequence in response to a failure indicator signal from the power supply controller, wherein the failure isolation sequence includes:
    disconnecting a plurality of the load supplies by contemporaneously opening supply connect switches of the plurality corresponding to the load supplies; and
    sequentially reconnecting the plurality of load supplies by sequentially closing the supply connect switches of the plurality of load supplies while monitoring a current and voltage level on the supply cable.

8. The downhole power supply of claim 1, wherein a network control power supply is configured to receive power from the source power supply and is configured to generate an output voltage to startup the network controller and the load supplies.

9. The downhole power supply of claim 8, further comprising a voltage conditioning element coupled between the network control power supply and the source power supply, the voltage conditioning element comprising a low-pass filter or a shunt regulator.

10. The downhole power supply of claim 8, wherein the network control power supply comprises a switched-mode voltage regulator.

11. The downhole power supply of claim 10, wherein the switched-mode voltage regulator comprises a flyback converter.

12. The downhole power supply of claim 10, wherein the network control power supply further comprises:
   a pre-regulator coupled between the supply cable and a low-dropout regulator and configured to step down voltage on the supply cable, wherein the low-dropout regulator is coupled between the pre-regulator and the switched-mode voltage regulator, said low-dropout regulator configured to:
      limit startup current of the switched-mode voltage regulator; and
      convert voltage from the pre-regulator to a regulated output voltage received at an input of the switched-mode voltage regulator.

13. A method for managing downhole distribution of electric power, said method comprising:
   connecting a downhole distribution network to a source power supply, wherein the downhole distribution network comprises a network controller and a plurality of load supplies coupled to the network controller, each of the load supplies having a supply connect switch between the load supply and the source power supply; and
   in response to determining a failure within the downhole distribution network, the network controller disconnecting at least one of the load supplies from the source power supply by opening a supply connect switch of the at least one of the load supplies.

14. The method of claim 13, wherein the source power supply comprises a supply cable coupled to an electric energy source, and wherein determining the failure within the downhole distribution network comprises identifying a device in which the failure occurred, including, in response to detecting a current or voltage level on the supply cable:
   disconnecting a plurality of the load supplies by contemporaneously opening supply connect switches of the plurality of the load supplies; and
   sequentially reconnecting the plurality of load supplies by sequentially closing the supply connect switches of the plurality of load supplies while monitoring the current and the voltage level on the supply cable.

15. The method of claim 13, wherein the source power supply includes a supply cable coupled to an electric energy source, and wherein the downhole distribution network includes a network control power supply, said method further comprising:
   applying power from the electric energy source to the supply cable; and
   wherein said connecting the downhole distribution network to the source power supply includes initializing the downhole distribution network by applying power from the supply cable to activate the network control power supply while the supply connect switches of the load supplies are open.

16. The method of claim 15, wherein said connecting the downhole distribution network to the source power supply further includes:
   applying power from the network control power supply to activate the network controller; and
   in response to the application of power from the network control power supply, the method further comprising, determining, by the network controller, an operational status of one or more of the load supplies; and
   activating, by the network controller, one or more of the load supplies based, at least in part, on the determined operational status.

17. The method of claim 16, wherein the activating, by the network controller, the one or more of the load supplies includes executing, by the network controller, a load supply activation sequence in which two or more of the load supplies are activated in a sequence that is based, at least in part, on power outputs of the two or more load supplies.

18. The method of claim 13, wherein determining the failure within the downhole distribution network comprises detecting a failure in a load supply or a load.

19. The method of claim 13, wherein the one or more of the load supplies comprise switched-mode voltage regulators.

20. An apparatus comprising:
   a processor; and
   a machine-readable medium having program code executable by the processor to cause the apparatus to,
   connect a downhole distribution network to a source power supply, wherein the downhole distribution network comprises a network controller and a plurality of load supplies coupled to the network controller, each of the load supplies having a supply connect switch between the load supply and the source power supply; and
   in response to determining a failure within the downhole distribution network, the network controller disconnecting at least one of the load supplies from the source power supply by opening a supply connect switch of the at least one of the load supplies.

* * * * *